US009719633B2

(12) United States Patent
Sacksteder

(10) Patent No.: US 9,719,633 B2
(45) Date of Patent: Aug. 1, 2017

(54) EXOSKELETON ARM INTERFACE

(75) Inventor: Anthony D. Sacksteder, Philadelphia, PA (US)

(73) Assignee: Garrett W. Brown, Philadephia, PA (US)

( * ) Notice: Subject to any disclaimer, the term of this patent is extended or adjusted under 35 U.S.C. 154(b) by 827 days.

(21) Appl. No.: 14/115,684

(22) PCT Filed: May 4, 2012

(86) PCT No.: PCT/US2012/036581
§ 371 (c)(1),
(2), (4) Date: May 12, 2014

(87) PCT Pub. No.: WO2012/154580
PCT Pub. Date: Nov. 15, 2012

(65) Prior Publication Data
US 2015/0001269 A1    Jan. 1, 2015

Related U.S. Application Data

(60) Provisional application No. 61/483,386, filed on May 6, 2011.

(51) Int. Cl.
*F16M 1/00*   (2006.01)
*F16M 13/04*  (2006.01)
*B25J 9/00*   (2006.01)
*B25J 19/00*  (2006.01)

(52) U.S. Cl.
CPC ............ *F16M 13/04* (2013.01); *B25J 9/0006* (2013.01); *B25J 19/002* (2013.01); *B25J 19/0016* (2013.01)

(58) Field of Classification Search
CPC ....... F16M 13/04; B25J 9/006; B25J 19/0016; B25J 19/002; B25J 9/1694; B25J 13/086; G03B 17/56; G03B 17/561; G03B 17/568; B66F 11/00
USPC .......................................... 248/652
See application file for complete search history.

(56) References Cited

U.S. PATENT DOCUMENTS

| 3,923,166 | A | 12/1975 | Fletcher et al. | |
|---|---|---|---|---|
| 4,206,983 | A * | 6/1980 | Nettman | A45F 3/10 224/201 |
| 4,957,320 | A * | 9/1990 | Ulrich | B25J 9/102 192/56.1 |
| 5,360,196 | A | 11/1994 | DiGiulio et al. | |
| 2007/0056592 | A1* | 3/2007 | Angold | A61H 3/00 128/845 |
| 2007/0241696 | A1* | 10/2007 | Lauria | B25J 9/102 318/116 |

(Continued)

OTHER PUBLICATIONS

International Search Report and Written Opinion for Patent Application on PCT/US2012/036581, dated Aug. 6, 2012.

*Primary Examiner* — Christopher E Garft
(74) *Attorney, Agent, or Firm* — Diedericks & Whitelaw, PLC

(57) ABSTRACT

A support arm interface for connecting a dynamic assist support arm to an exoskeleton structure having a chassis, a connection component on the chassis configured to pivotably attach a dynamic assist support arm thereto, a connection component on the chassis configured to attach an exoskeleton thereto and a leveling mechanism attached to the chassis and configured to level the dynamic assist support arm interface.

23 Claims, 7 Drawing Sheets

(56) References Cited

U.S. PATENT DOCUMENTS

| | | | | |
|---|---|---|---|---|
| 2009/0210093 A1* | 8/2009 | Jacobsen | ............... | A61H 3/008 700/260 |
| 2010/0254696 A1* | 10/2010 | McKay | ................ | F16M 13/04 396/420 |
| 2011/0266323 A1* | 11/2011 | Kazerooni | ............ | B25J 9/0006 224/575 |

* cited by examiner

EXOSKELETON ARM INTERFACE

BACKGROUND OF THE INVENTION

Dynamic assist support arms, such as the zeroG® dynamic assist support arms by Equipois Inc., which are unpowered and function via the iso-elastic property of a spring driven lift mechanism (for example as disclosed in U.S. Pat. Nos. 5,360,196; 5,435,515; and 7,618,016 and improvements and modifications thereto and variations thereof, the designs of which are incorporated herein by reference) allow users to manage heavy loads such as industrial tools and professional camera equipment. To provide a neutral lateral force throughout the range of motion (ROM) it is necessary for the mounting point of the arm to its supporting structure to maintain a nearly plumb or vertical orientation for the first or most proximal lateral axis. If this initial axis departs from vertical, the effect is to cause the arm to bias unfavorably in the direction of the departure from vertical, resulting, in many circumstances, in unfavorable performance and additional effort to control the payload position, as well as defeating the ergonomic benefits of the system.

The terms "zeroG®" or dynamic assist support arm is used herein to mean a support arm, which functions via the iso-elastic property of a spring (or other resilient member) driven lift mechanism, and is not intended to be limited to a particular product.

Current practice for fixed mounting of dynamic assist support arms is to provide a mounting interface that connects the arm system to a permanent structure via an adjustable device that provides two axes of movement, permitting adjustment of the relationship of the arm's attitude relative to the fixed structure in order to maintain the requisite vertical orientation of the ordinate arm axis.

The related practice for use of dynamic assist support arms, such as those used for holding a camera apparatus (for example, Steadicam® support arms), in a wearable manner attached to one's torso also has a similar feature for providing a gross adjustment of the ordinate arm axis. Fine adjustment is achieved by operators of these systems by maintaining a correct and stable posture wherein only slight purposeful deviations of the arm's ordinate axis from vertical are used to intentionally direct the resulting bias of the arm in a favorable and planned manner.

Typically users of torso mounted arm support systems must stand fully erect, and are unable to lean forward, backward or sideways by any appreciable amount as may be frequently required during the use of powered hand tools supported by the dynamic assist support arm system in an industrial application. Furthermore, kneeling, bending, stooping, sitting and other non-standing positions are almost always impossible without concomitant loss of arm control and neutral balance characteristics.

There are available exoskeleton systems designed to augment the function of the human trunk and lower extremities for the purpose of allowing the wearer to bear higher loads upon their backs, and to assist the users in ambulation while bearing those loads, or to allow users to traverse greater distances with less fatigue with or without additional load carrying capability.

What is needed is a mounting interface for dynamic assist support arm systems to exoskeletons and other wearable structures that allows for a desirable level of freedom of movement and positioning by the user that may include for example, kneeling, bending, stooping, sitting and other non-standing movements and positions.

SUMMARY OF THE INVENTION

Embodiments of the invention integrate a dynamic assist support arm with a lower extremity exoskeleton system or other wearable structures. This allows for loads borne by the dynamic assist support arms to be transmitted to the ground via the lower extremity exoskeleton rather than to the human musculoskeletal system, possibly resulting in higher payload carrying capability, reduced fatigue and elimination or reduction of ergonomic risks. A wearable mobile exoskeleton system with upper extremities that are dynamic assist support arms has numerous useful applications that include tool and equipment holding as well as material and payload moving and handling.

Embodiments of the invention provide a mounting interface to pivotably mount a dynamic assist support arm system to an exoskeleton system or other apparatus that includes a leveling mechanism that acts to maintain the arm pivot in a substantially vertical position or other chosen attitude.

DETAILED DESCRIPTION OF THE INVENTION

Figures 1A, 1B:
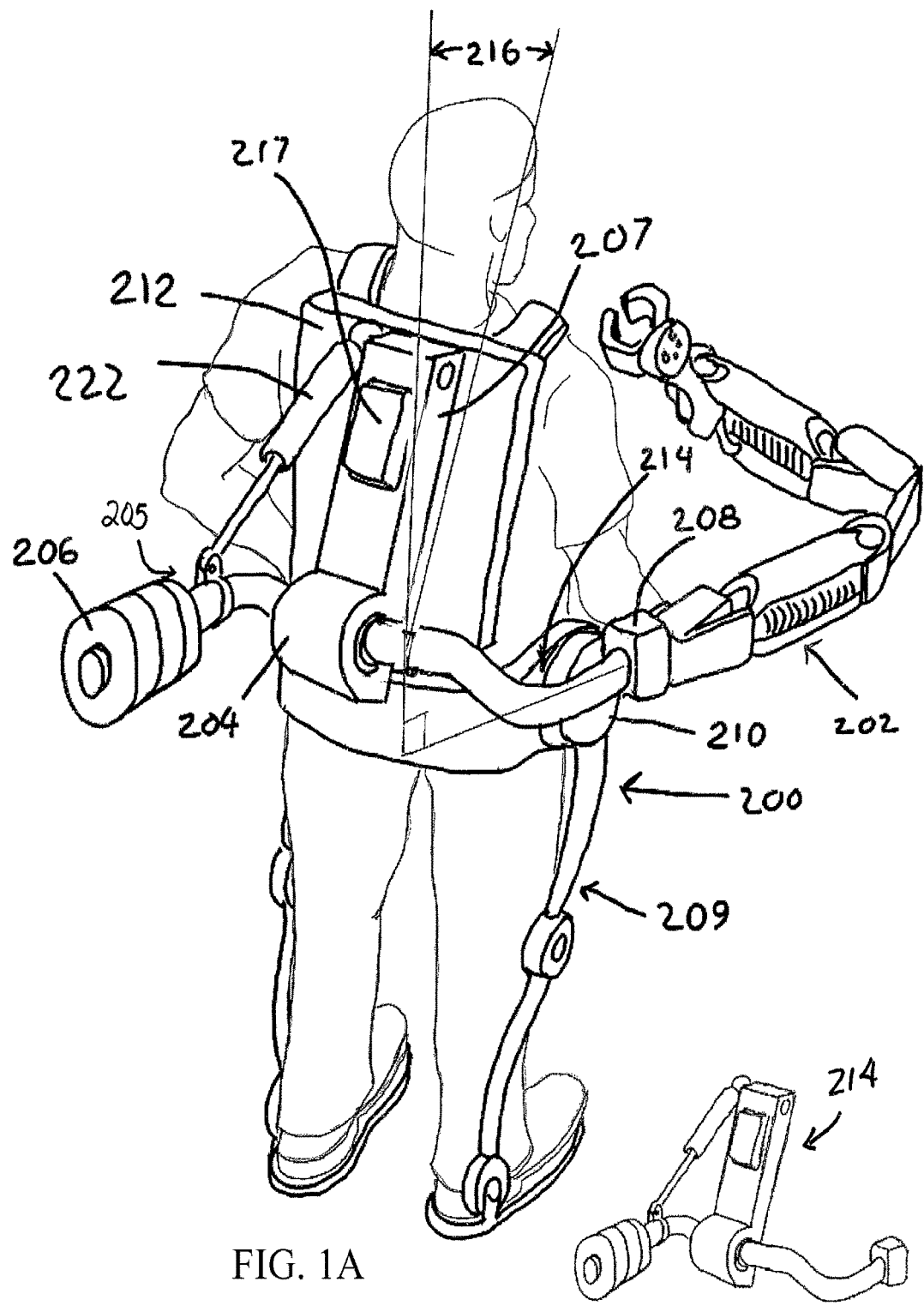
FIGS. 1A-B depict an exoskeleton system with a dynamic assist support arm interface according to an illustrative embodiment of the invention.

Fundamentally, currently available dynamic assist support arms require a mounting axle position that is substantially vertical in order to maintain a neutral bias about the vertical axes of motion. A neutral bias enables passive support and facilitates lateral and for-aft motion while the vertical motion is equipoised by the spring lifting system. The term "leveling" as used herein includes maintaining a vertical position, which in turn predicts a horizontal position of an axis orthogonal thereto, and vice versa. See for example the orthogonal axes depicted in FIG. 1A.

When a dynamic assist support arm is employed with a wearable lower extremity exoskeleton where the support arm is attached to moving elements of the exoskeleton, it is often desirable to maintain a level mounting position. This can be accomplished by providing a dynamic leveling mechanism that acts at the attachment point of the dynamic assist support arm to the exoskeleton system or elsewhere to level or selectively bias the support arm. When an arm acquires a payload an additional cantilevered load (i.e.

moment) is produced. This can also affect leveling of the apparatus. The additional load can be partially balanced by providing counter-weights on the opposite side of a leveling pivot or fulcrum in order to further reduce the power required by the exoskeleton to transfer these loads to the ground. The counter weights may also reduce the amount and degree of leaning backwards that a user must do in order to compensate for the cantilevered load to maintain a neutral balance.

There are primarily two useful attachment positions upon the human musculoskeletal system or upon a human worn exoskeletal system where the interface to dynamic assist support arms is practical:

1) Torso or upper body, defined to mean above the pelvis of the human musculoskeletal system, or upon the upper body or torso frame of an exoskeleton system. At this location, without the auxiliary support of a lower extremity exoskeleton system that extends to the upper body, loads and forces produced by an arm supported payload are transmitted through the shoulders and torso through the spine into the pelvis and then the legs, etc. Furthermore, the ranges of motion of the torso that depart from vertical are typically more frequent and of relatively large magnitude during regular activities such as might be encountered during the applied use of such a system. Significant cantilever loads are placed on the lower back and contribute to the problem of lower back injury.

Where an exoskeleton system is used that has upper body elements, the system should be able to accommodate the same cantilevered loads and transfer those loads to the ground safely without impeding the kinematics of the lower extremity supports or impeding natural ranges of motion or gait.

2) Pelvis, hip or lower extremity of the human musculoskeletal system is another attachment position. When the attachment point of a dynamic assist support arm to the human musculoskeletal system or to a human worn exoskeletal system occurs at the pelvis level or below, forces must still be carried to the ground, but need not be transmitted through the vulnerable human spine and lower back. Additionally, typical leaning and bending maneuvers that are frequently encountered during normal industrial use would have little or no effect on either the human or exoskeleton systems. Unless prone, seated or kneeling on one knee, the attitude of the pelvis remains relatively static and the upper thigh of a human doing many tasks is very likely to be within a few degrees of vertical. The advantage of this is that the range of motion required for final adjustment to true vertical for a stabile arm mounting platform is minimal.

Embodiments of the invention generally may provide or maintain a near vertical, plumb interface for mounting a dynamic assist support arm to an exoskeleton system. Embodiments of the invention also provide a mechanism to counter balance the cantilever load of an extended dynamic assist support arm and its payload so that the net moment at the fulcrum is minimal, thereby reducing the force and energy required to position the leveling axes, preferably to a minimum.

Figure 7:
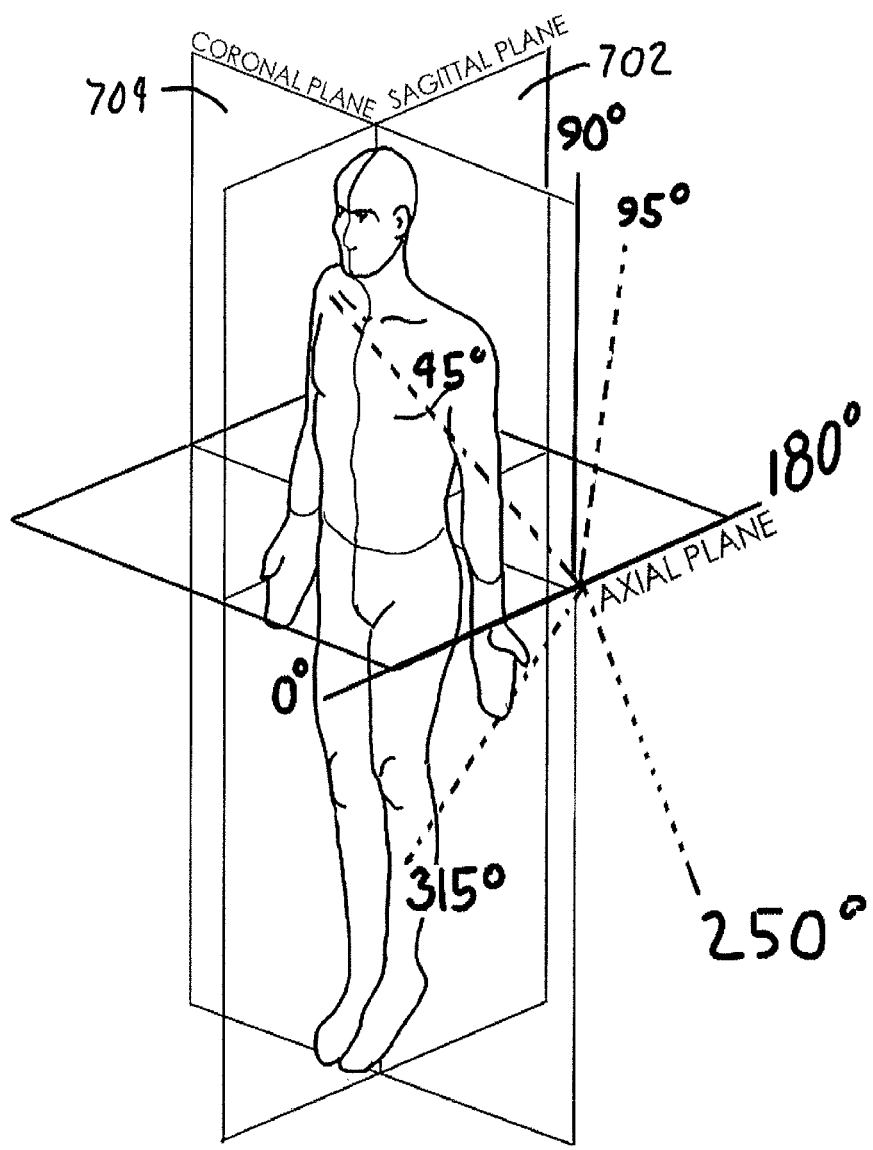
FIG. 7 depicts axes of rotation controlled by a leveling interface according to illustrative embodiments of the invention.

FIG. 7 depicts axes of rotation according to illustrative embodiments of the invention. Rotation about some or all of these axes can be included in various embodiments of the invention. A leveling mechanism incorporated into the arm interface will address movement about one or more of these axes.

Front to back tilt is about a primary axis providing rotation in the sagittal plane 702 to accommodate bend at the torso. An illustrative sagittal ROM is about 45 to about 95 degrees, (0 at horizontal forward) if mounted above the pelvis height. An illustrative sagittal ROM is about 250 to about 315 degrees for the upper thigh or pelvis if mounted at the pelvis or below.

Roll is about a secondary axis providing rotation in the coronal plane 704 to accommodate right-left lean. An illustrative range of roll plane ROM is less, +/−10 to 15 degrees.

Various modes of operation can be implemented to position the axes of rotation for leveling purposes. In an illustrative embodiment of the invention, operation is manual and non-motorized. This essentially involves a braking feature. The arm mount is released by the operator allowing it to tilt in the sagittal and/or coronal plane, repositioned by the operator to a substantially neutral plumb orientation, and then relocked to resume semi-static activity.

In a further embodiment of the invention a motorized operation is implemented. An arm mount is operated via a motorized tilting stage. The stage may provide one or two axes of rotation. Control of the motorized system can be either manual or automatic. For manual control, actuation is in response to a switch or other manual input initiated by the user.

For automatic control, actuation is driven by a sensor input, such as a rate sensor or accelerometer. Tilting of the upper torso is detected by the sensor, and the mount is driven accordingly to maintain neutral position of the arm attachment interface.

A closed loop method of control that has a sensing device on the moving side of the arm interface to provide the position achieved and a similar sensor on the human or exoskeleton side to provide the commanded signal to an actuator can provide active real-time leveling without user interaction.

Manual input for trim settings of the leveling control can provide the user with the ability to tailor the dynamic assist arm's lateral biasing behavior to suit the particular application. For example, if a forward thrust force is required, the control would provide a forward lean to the arm's ordinate axis, which would in turn provide for a portion of the arm payload force to be transmitted into a forward direction. This would be helpful in applications such as sanding of planar vertical surfaces, where the user must apply a forward "push" to keep the tool engaged.

FIG. 1A depicts an exoskeleton system 200 according to an illustrative embodiment of the invention. FIG. 1B is an enlargement of the arm interface 214 of FIG. 1A. This exoskeleton system is for lower extremities, with a component for connecting a dynamic assist support arm 202 at connection component 208 to an upper torso or backpack element of the lower extremity exoskeleton system.

A pivot component, such as pivoting bearing 204 or other hinge or rotational component, provides tilt in the sagittal plane of the movable portion of the interface system. Pivot bearing 204 is located on a lower portion of chassis 207 and will be referred to herein as a "bottom" pivot bearing position. Counterweights 206 provide gross balancing of the cantilever moment produced by the arm and its payload. Use of counterweights 206 can reduce the gross power requirement for motorized or manual positioning.

A mechanism can be provided to variably adjust the lateral position of a counterweight assembly substantially parallel to the sagittal plane. This can provide a mediating balance for instances where only one dynamic assistive arm is in use, to shift the net center of mass of the entire system inclusive of the lower extremity exoskeleton, the dynamic arm and its interface device as a whole as close as possible to the sagittal plane to achieve a neutrally balanced condition.

Exoskeleton system 200 has a leg portion 209. Leg portion 209 culminates at hip joint 210 of exoskeleton system 200. Exoskeleton system 200 also has a torso or backpack portion 212. The angle 216 of torso portion 212 with respect to the vertical varies, however, the ordinate axis of the arm interface 214 is preferably disposed substantially vertically.

Figure 2A:
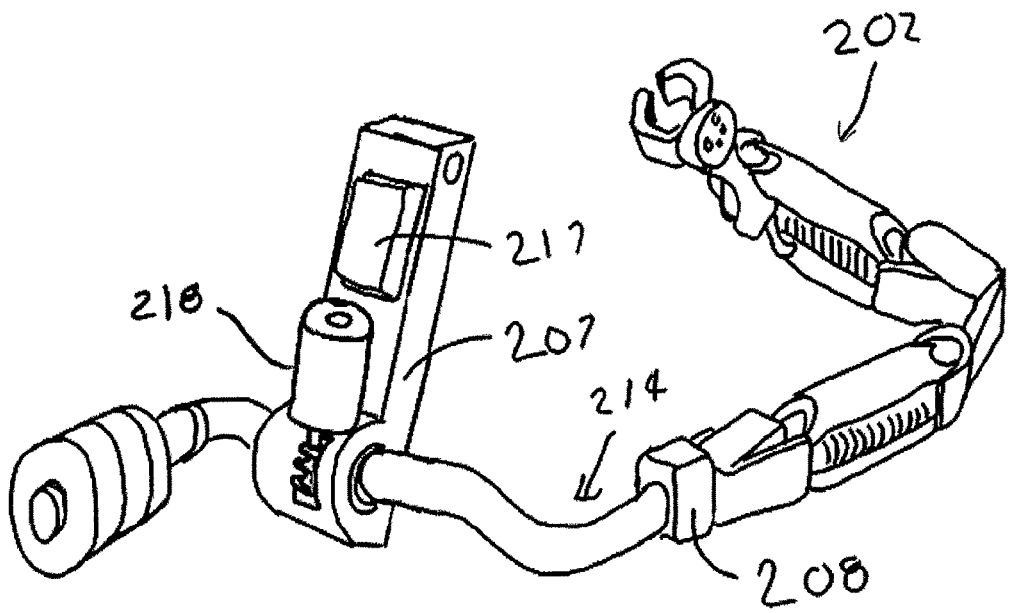
FIGS. 2A-B depict an arrangement of a tilting interface support strut according to an illustrative embodiment of the invention.
Figure 2B:
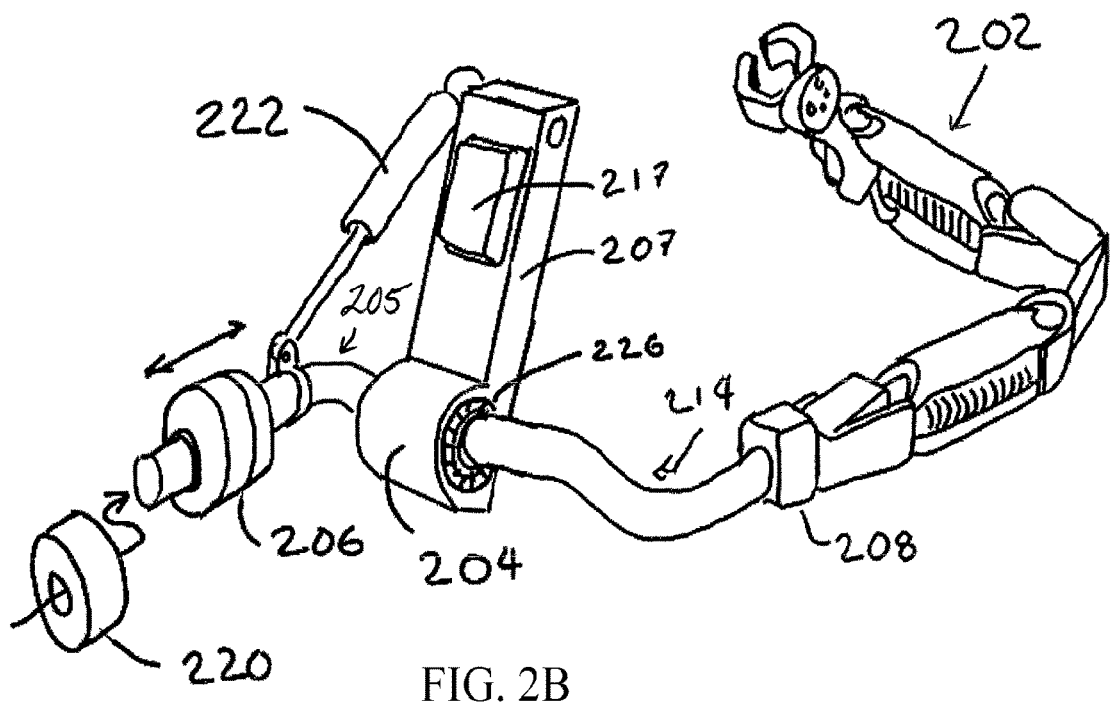

FIGS. 2A-B depict an arrangement of a tilting interface support strut with a primary axis bearing and alternative mechanism of driving the bearing according to an illustrative embodiment of the invention. An automatic, motorized feedback loop or a manual, operator controlled system can be utilized. In an exemplary embodiment of the invention, a full servo-motor feedback loop is used.

Manual Control System:

A manual control system for leveling and counter-weighting adjustment may be useful, for example in cases where reduction of cost, total system complexity reduction, weight reduction or particular suitability to repetitive tasks is indicated. In such an implementation, the position of deployment of counterweights 206 (see also 406) upon a moveable counterweight structure 205 (see also, 305, 405, 505) relative to the coronal and sagittal planes is set by the user by use of a controller, such as a hand-held or pendant-type motor controller in the form of a simple switch box, that translates the counterweight fore/aft and right/left as needed to suit the operator's sense of balance and comfort.

Automatic Control System:

An automatic control system that monitors the payload, moment and angular positions may be used, for example, for deployments that require simplicity of user interaction and seamless operation regardless of the payload and operating conditions. To do so, various inputs are required, which may be sensed directly, communicated from other subsystems or inferred from other operating parameters. In an exemplary embodiment of the invention, three inputs are used, which include a) instantaneous net moment presented by the arm interface device to the exoskeleton at the connection point of the arm interface device to the exoskeleton, which can be sensed with a strain gauge or other force measurement device located at that connection; b) the instantaneous angular deviation of the arm interface device from plumb, and the angular position of the portion of the exoskeleton to which the arm interface device is connected. This angle can be derived for example from the output of an accelerometer that is located within the arm interface device itself or can be communicated from the exoskeleton's own accelerometer if so equipped; and c) the mass of the payload being acted upon. This assumes that in the system design the total mass and weight distributions for the arm, its counterweights and ancillary components are all already known. With this information, a programmable logic controller can be employed in conjunction with a PID (position-integral-derivative) algorithm to provide the correct amount of counterweight repositioning to offset the cantilever loading produced by the arm-supported payload.

FIG. 2A shows a worm gear system 218 that is not back-drivable, and therefore requires no power for static holding of an achieved position. Other non-back drivable mechanisms can be used, such as ratchet devices for example. FIG. 2B depicts a mechanism of variably adjusting counterweight 206 by adding segments of weight 220 and or positioning the weights further from the fulcrum.

An alternative device for actuating the tilt system, as shown in FIG. 2B, is with a gas, hydraulic or air cylinder 222, or alternatively telescoping shaft driven by a lead screw for example.

FIG. 2B shows a clutch or brake 226, used for manual holding, and manual repositioning by releasing brake 226. In the instance of an automated system, the brake provides a safety interlock to guard against unintended release of the arm interface from its holding position.

Figure 3A:
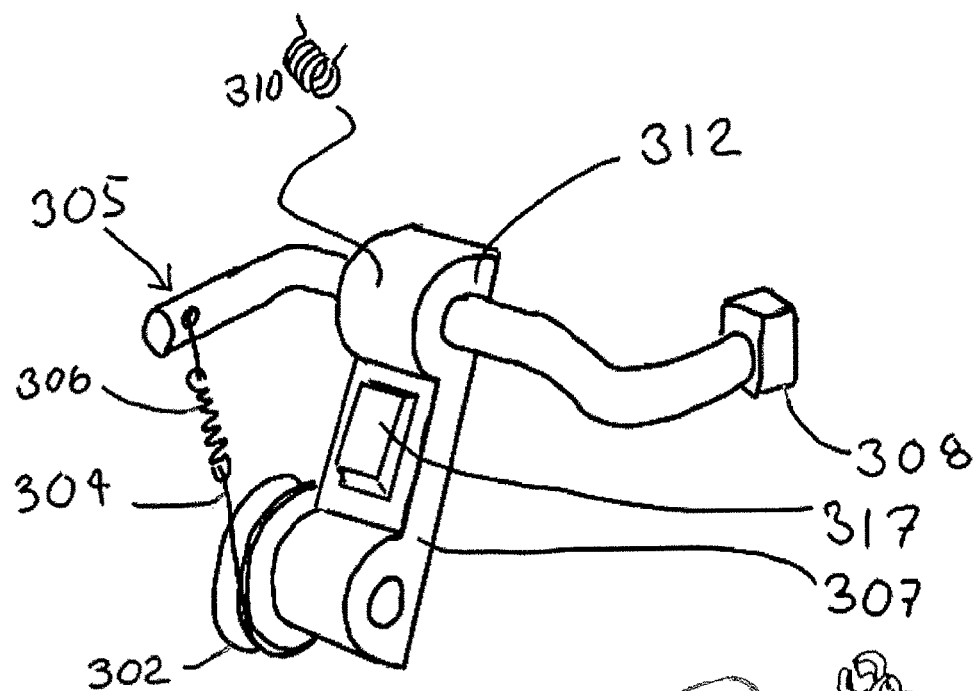
FIGS. 3A-B depict an arm interface arrangement with the position of the pivot bearing located higher upon the exoskeleton backpack according to an illustrative embodiment of the invention.
Figure 3B:
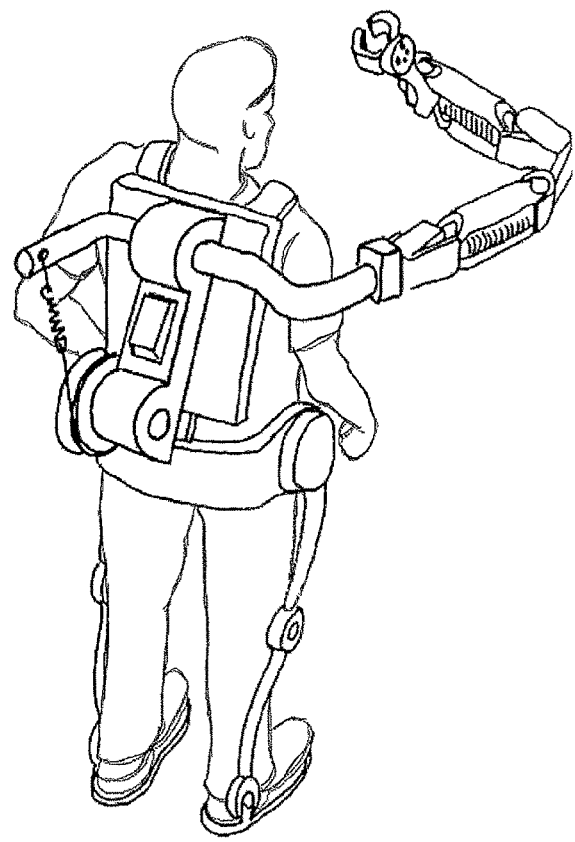

FIGS. 3A-B depict an arm interface arrangement similar to FIG. 2A-B, but with the position of the pivot bearing 312 located higher upon the exoskeleton backpack to facilitate an over-the-shoulder position for the arm interface device for high reach applications. This is referred to herein as a "top" pivot bearing position.

A single chassis can be configured to allow the pivot bearing to be located either at a top or bottom position. This can be accomplished by either having the chassis be invertable or by having a choice of pivot bearing connection locations on the chassis.

Instead of an actively counter-weighted system, an advantage of which is the reduction of cantilevered forces and power required to actuate the leveling mechanism, it may be suitable for the moment produced by the cantilever to be handled by the exoskeleton itself. This may be advantageous, for example, in cases when either the loads are relatively small or there is sufficient onboard power available for the exoskeleton to dynamically transfer loading through the hip, knee and ankle joints and actuate the leveling mechanism as shown.

An interface chassis 307 supports a winch 302 with cable 304 positioned to provide a balancing tension across pivot 312, transferring the load and moment of the arm and payload to the upper frame of the exoskeleton. A spring 306 in-line with tension cable 304 provides a damping effect to reduce shock and vibration transferred across the mounting interface. Introduction of a compliant element to the system may also improve the characteristics of the human-to-machine interface and in so damping the tensile, may reduce the momentary peak power requirement of the arm interface device system.

A lead screw, piston, cylinder or other linear actuation device can replace the winch drum to provide controlled tension to the cantilever portion 305 of the moveable counterweight structure.

Both the winch and linear actuator implementations can be either manually operated by hand crank or ratcheting lever for example, electromechanically manually operated by the user for example via a switch box controlled motor or operated automatically by a programmable logic controller (PLC) system (identified in the figures as 217, 317 and 417).

Use of a torsion spring 310 to provide a torsion balancing force at the primary pivot 312 instead of or in conjunction with counterweights may reduce the total mass and inertia of the system and provide a gross counter force to the moment of the unladen system itself. Thus, the active counter-weighting effect can be applied to compensate for the changing moments induced by the payload when it is attached and detached.

Figure 4A:
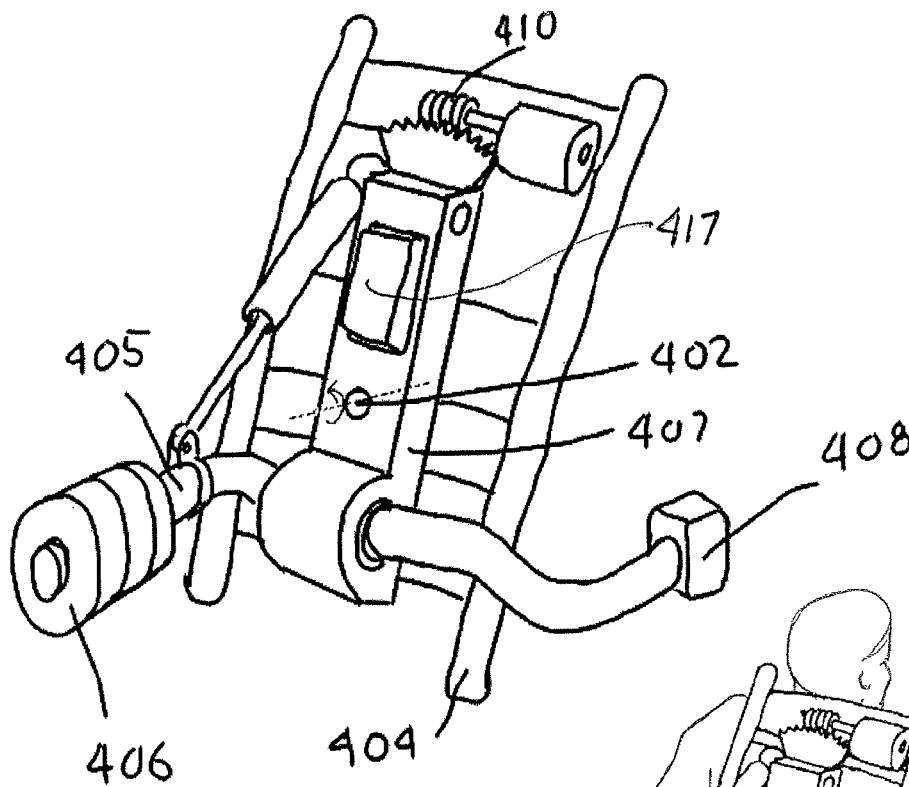
FIGS. 4A-B depict the disposition of a secondary axis according to an illustrative embodiment of the invention.

FIG. 4A depicts the disposition of a secondary axis 402 according to an illustrative embodiment of the invention, to provide side to side or roll axis leveling in the substantively coronal plane by means of similar actuation methods described with respect to FIGS. 2B and 3A-B. For example, a worm gear 410, piston, spring or cable and reel mechanism can be used. This axis of control can also be manually operated, electromechanically manually operated, or automatically operated by the PLC. This axis of control can provide the ability to fine tune and adjust the bias of the lateral motion of the arm system afforded by the pivoting of several vertical hinge joints that are typically employed by dynamic assist support arms and other similar exoskeletal arms.

Figure 4B:
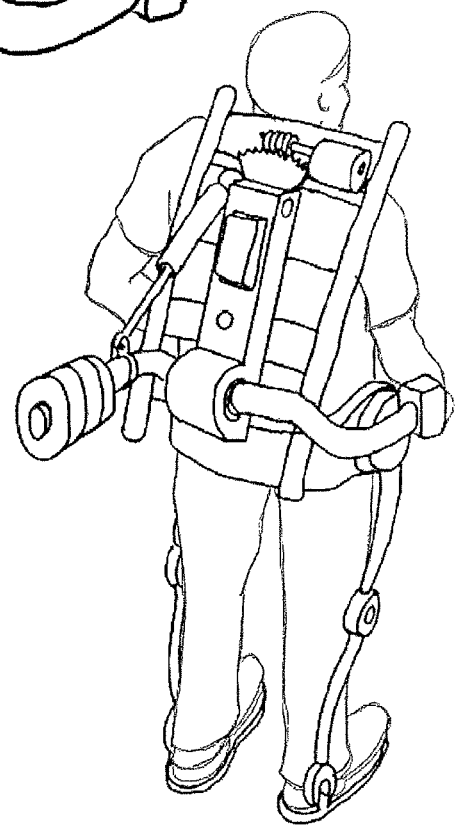

An illustrative backpack type frame 404 is shown in FIG. 4A, which can support the arm interface device of the exoskeleton system. Further shown in FIG. 4A is a leveling mount interface chassis 407. FIG. 4B depicts a user outfitted with the arm interface of FIG. 4A.

Figure 5A:
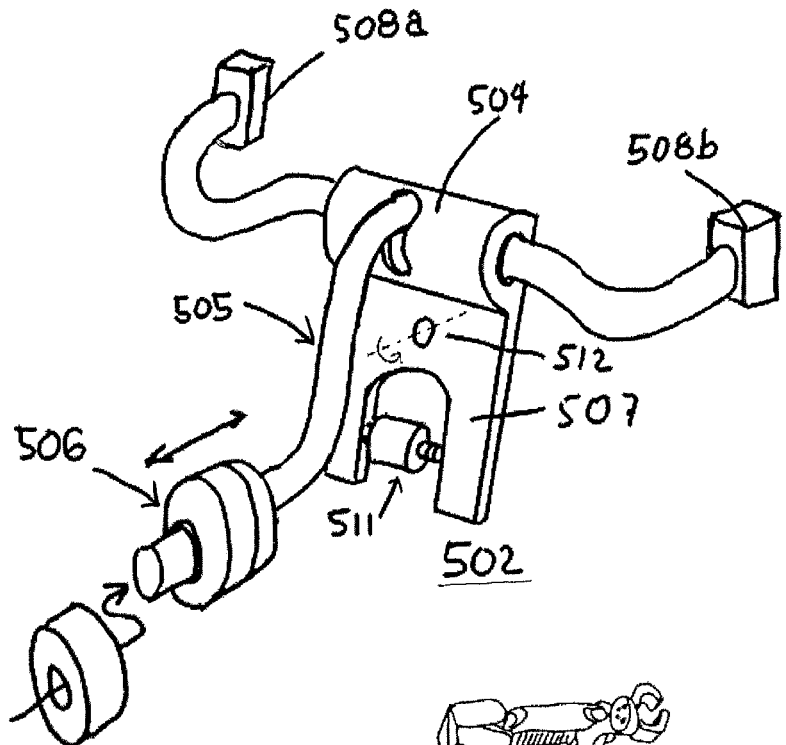
FIGS. 5A-B show a double interface for mounting two arms according to an illustrative embodiment of the invention.
Figure 5B:
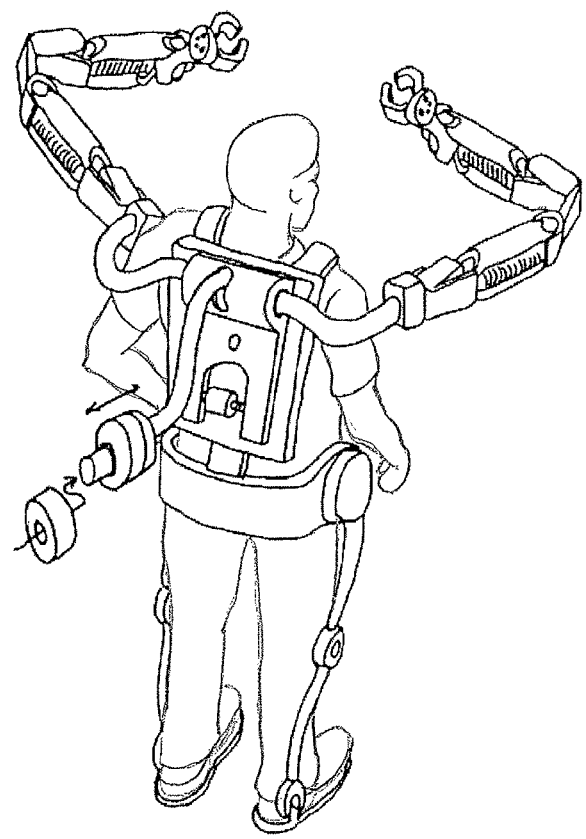

FIGS. 5A-B show a double interface 502 that provides for mounting two arms simultaneously at connection components 508a, 508b, according to an illustrative embodiment of the invention. Connection components 508a, 508b are provided on an upper mount, allowing the dynamic assist support arms to be mounted near or above the user's shoulders. This facilitates higher reaching activities or where obstructions at mid and lower torso levels may be present. The double mount may also be used at the other levels mentioned, which may effectively double the payload lifting capacity by using two arms in parallel, and is not restricted to the requirement for higher reach.

Mounting interface chassis 507 provides structure for implementation of a secondary axis 512 to provide side to side or roll axis leveling in the substantively coronal plane by means of similar actuation methods described with respect to FIGS. 2A-B and 3A-B. An actuator 511 is provided for this second axis. For example, a worm gear, piston, spring or cable and reel mechanism can be used. This axis of control can also be manually operated, electromechanically manually operated, or automatically operated by a PLC and provides the ability by which to fine tune and adjust the bias of the lateral motion of the arm system afforded by the pivoting of several vertical hinge joints that are typically employed by zeroG® and other similar arms.

A single counter weight strut 505 that supports counterweight 506 operates as described with respect to FIGS. 2A-B. A torsion spring can also be used to provide a torsion balancing force at the primary pivot 504 instead of or in conjunction with counterweights as described with respect to FIGS. 3A-B.

Figure 6:
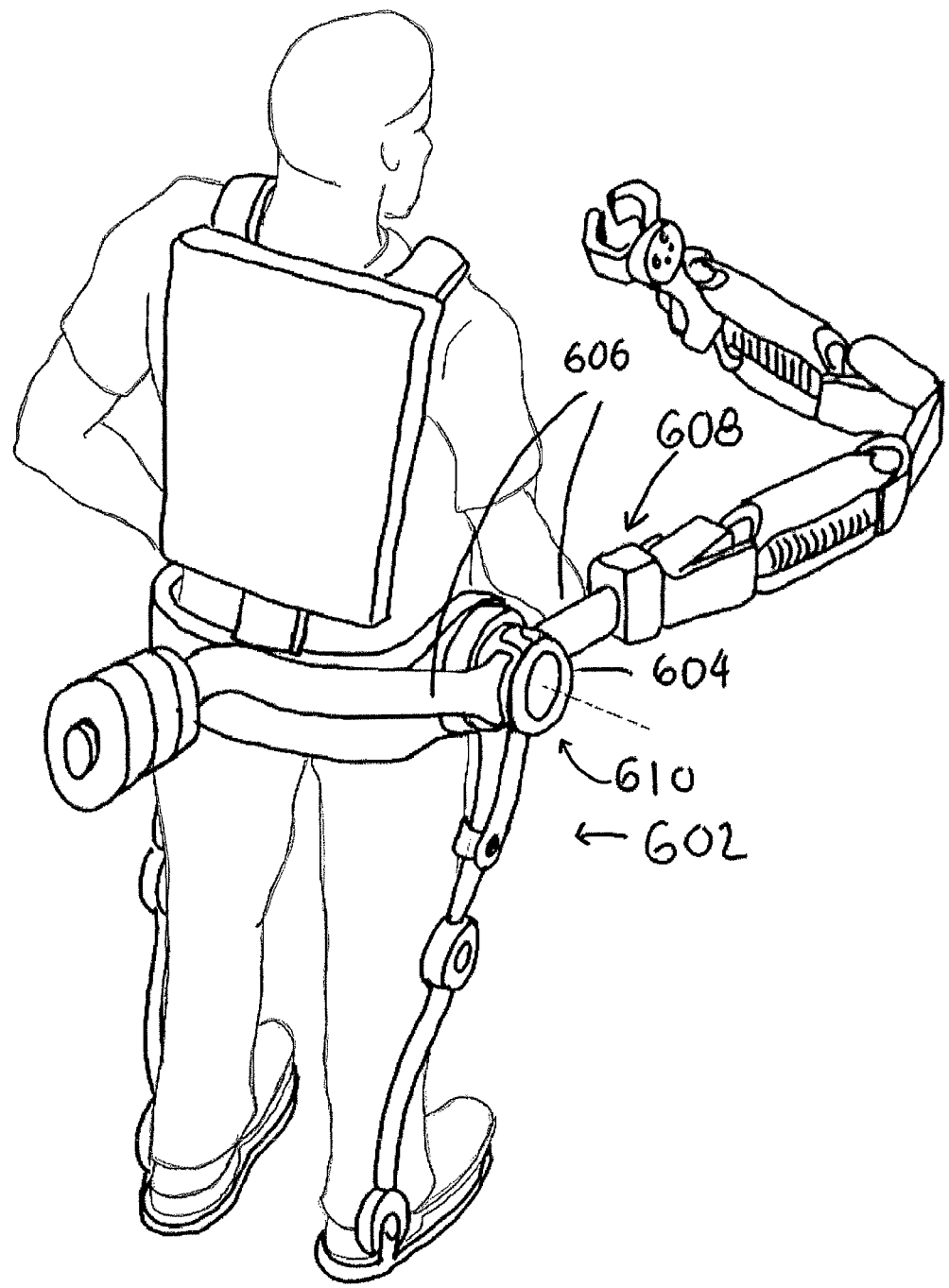
FIG. 6 depicts an illustrative embodiment of a mounting location of a leveling interface at the hip joint or pelvis connection according to an illustrative embodiment of the invention.

FIG. 6 depicts an illustrative embodiment of an alternative mounting location of a leveling interface 604 at the hip joint or pelvis connection level, which provides a reduced requirement for range of tilting rotation and a different means of transferring cantilever loads to the exoskeleton. A lower extremity exoskeleton 602 (leg assembly) is attached to leveling interface 604. It may be releasably or fixedly attached, and is preferably pivotally attached for many applications.

A mounting interface chassis 606 includes a connection component 608 for attachment of a dynamic assist support arm and a connection component 610, which is preferably co-axial with the pivoting hip joint for attachment of lower extremity exoskeleton 602. The leveling interface in this embodiment is about hip/pelvis height.

The invention may be embodied in a variety of ways, for example, a system, method, device, etc.

Various embodiments of the invention have been described, each which may have a different combination of elements. The invention is not limited to the specific embodiments disclosed, and may include different combinations of the elements disclosed and their equivalents.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. Accordingly, it is intended that the invention not be limited to the specific illustrative embodiments, but be interpreted within the full spirit and scope of the appended claims and their equivalents.

The invention claimed is:

1. An exoskeleton system comprising:
   a backpack portion configured to be worn upon a torso of a wearer;
   a leg portion configured to extend along at least one leg of the wearer;
   a hip joint portion providing for relative pivotal movement between the leg portion and the backpack portion; and
   a support arm interface including:
     a pivot component positioned at one of the backpack and hip joint portions;
     an arm including first and second end portions, said arm being supported, at a position between the first and second end portions, by the pivot component such that the arm can pivot relative to each of the backpack and hip joint portions;
     a dynamic assist support arm connection component provided at the first end portion of the arm and configured for attachment to a dynamic assist support arm; and
     a leveling mechanism for controlling pivoting of the arm relative to the backpack and hip joint portions, said leveling mechanism including a counterweight structure provided at the second end portion of the arm.

2. The exoskeleton system of claim 1, further comprising: a dynamic assist support arm attached to the dynamic assist support arm connection component, said leveling mechanism controlling pivoting of the arm to counter loads borne by the dynamic assist support arm.

3. The exoskeleton system of claim 1, wherein the pivot component is positioned at the hip joint portion.

4. The exoskeleton system of claim 1, wherein said support arm interface further includes a chassis mounted to the backpack portion such that the pivot component is positioned at the backpack portion.

5. The exoskeleton system of claim 4, wherein the chassis is pivotally attached to the backpack portion.

6. The exoskeleton system of claim 5, wherein the chassis is attached to the backpack portion for pivotal movement about a first axis which is substantially perpendicular to a second axis about which the arm is pivotably supported by the pivot component.

7. The exoskeleton system of claim 6, wherein the chassis has a pivot range of motion relative to the backpack portion of up to 30 degrees.

8. The exoskeleton system of claim 5, further comprising: an actuation component for shifting the chassis relative to the backpack portion.

9. The exoskeleton system of claim 8, wherein the actuation component comprises a worm gear system.

10. The exoskeleton system of claim 1, wherein the second end portion is cantilevered and the counterweight structure includes a counterweight having one or more segments of weight configured to be added to and positioned along the counterweight structure to variably adjust a reaction moment produced at the second end portion.

11. The exoskeleton system of claim 1, wherein the leveling mechanism further comprises a torsion spring for biasing the arm.

12. The exoskeleton system of claim 4, wherein the leveling mechanism further comprises a winch provided on the chassis and a cable extending between the winch and the second end portion of the arm.

13. The exoskeleton system of claim 4, further comprising a linear actuator extending between the chassis and the second end portion of the arm.

14. The exoskeleton system of claim 1, wherein the leveling mechanism further comprises a clutch or brake acting between the pivot component and the arm.

15. The exoskeleton system of claim 1, wherein the arm includes a third end portion provided with an additional dynamic assist support arm connection component configured for attachment to another dynamic assist support arm.

16. A support arm interface for an exoskeleton comprising:
   a pivot component;
   an arm including first and second end portions, said arm being supported, at a position between the first and second end portions, by the pivot component;
   a dynamic assist support arm connection component provided at the first end portion of the arm and configured for attachment to a dynamic assist support arm; and
   a leveling mechanism for controlling pivoting of the arm, said leveling mechanism including a counterweight structure provided at the second end portion of the arm wherein the second end portion is cantilevered and the counterweight structure includes a counterweight having one or more segments of weight configured to be added to and positioned along the counterweight structure to variably adjust a reaction moment produced at the second end portion.

17. The support arm interface of claim 16, further comprising: a dynamic assist support arm attached to the dynamic assist support arm connection component, said leveling mechanism controlling pivoting of the arm to counter loads borne by the dynamic assist support arm.

18. The support arm interface of claim 16, wherein said support arm interface further includes a chassis.

19. The support arm interface of claim 18, wherein the leveling mechanism further comprises a winch provided on the chassis and a cable extending between the winch and the second end portion of the arm.

20. The support arm interface of claim 18, further comprising a linear actuator extending between the chassis and the second end portion of the arm.

21. The support arm interface of claim 16, wherein the leveling mechanism further comprises a torsion spring for biasing the arm.

22. The support arm interface of claim 16, wherein the leveling mechanism further comprises a clutch or brake acting between the pivot component and the arm.

23. The support arm interface of claim 16, wherein the arm includes a third end portion provided with an additional dynamic assist support arm connection component configured for attachment to another dynamic assist support arm.

* * * * *